United States Patent [19]
Thompson et al.

[11] 3,806,630
[45] Apr. 23, 1974

[54] ENCAPSULATED SPLICE ASSEMBLY FOR BURIED CABLES

[76] Inventors: John T. Thompson, 244 Loring St., Los Angeles, Calif. 90024; George W. Gillemot, 2331 20th St., Santa Monica, Calif. 90405

[22] Filed: Aug. 21, 1972

[21] Appl. No.: 282,158

[52] U.S. Cl. ............... 174/72 R, 29/628, 174/37, 174/76, 174/78, 174/87, 174/93
[51] Int. Cl. .................. H02g 9/02, H02g 15/08
[58] Field of Search ......... 174/76 R, 77, 78, 91-93, 174/87, 88 R, 38; 29/629, 628, 630 R 29/264, 272

[56] References Cited
UNITED STATES PATENTS

| | | | |
|---|---|---|---|
| 3,614,295 | 10/1971 | Gillemot et al. | 174/87 |
| 3,676,836 | 7/1972 | Gillemot et al. | 174/78 UX |
| 3,725,580 | 4/1973 | Thompson et al. | 174/87 X |
| 3,725,581 | 4/1973 | Gillemot et al. | 174/78 X |
| 3,728,467 | 4/1973 | Klayum et al. | 174/78 X |

*Primary Examiner*—Darrell L. Clay
*Attorney, Agent, or Firm*—Sellers and Brace

[57] ABSTRACT

A method and assembly providing an inexpensive mode of encapsulating splice connections between a multi-conductor shielded main cable and branchout service cables and which assembly is adapted to be buried directly in dirt. An unsheathed short length of the main cable is formed into a tight loop and inserted through the bottom of a cap of supple elastomer and the loop legs are snugly anchored together independently of the cap by a conductive bonding tie extending crosswise of the legs and clamped to the sheath of each leg and sufficiently strong to hold the loop legs against relative movement. The service cables extend through the bottom of the cap and are spliced to selected loop conductors before the main body tube is pressed into the end cap and filled with either thermosetting or a non-setting potting compound to encapsulate the assembly. The main housing is preferably closed by a second snug fitting cap of elastomer. If a non-setting gel compound is used the assembly may be re-entered. The three-piece housing requires no clamps or assembly fasteners but is hermetically sealed by the forced fit between the ends of its main body and the supple end caps supplemented by cohesive and adhesive properties of the charge of potting compound.

15 Claims, 9 Drawing Figures

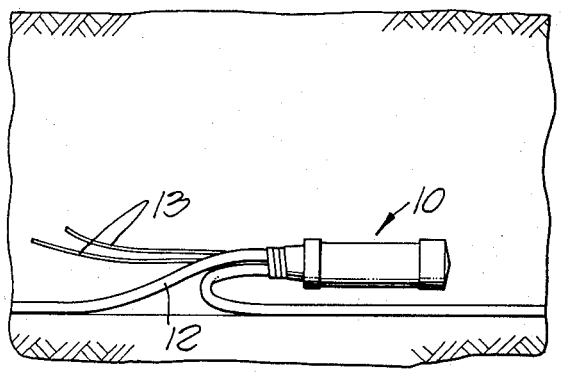
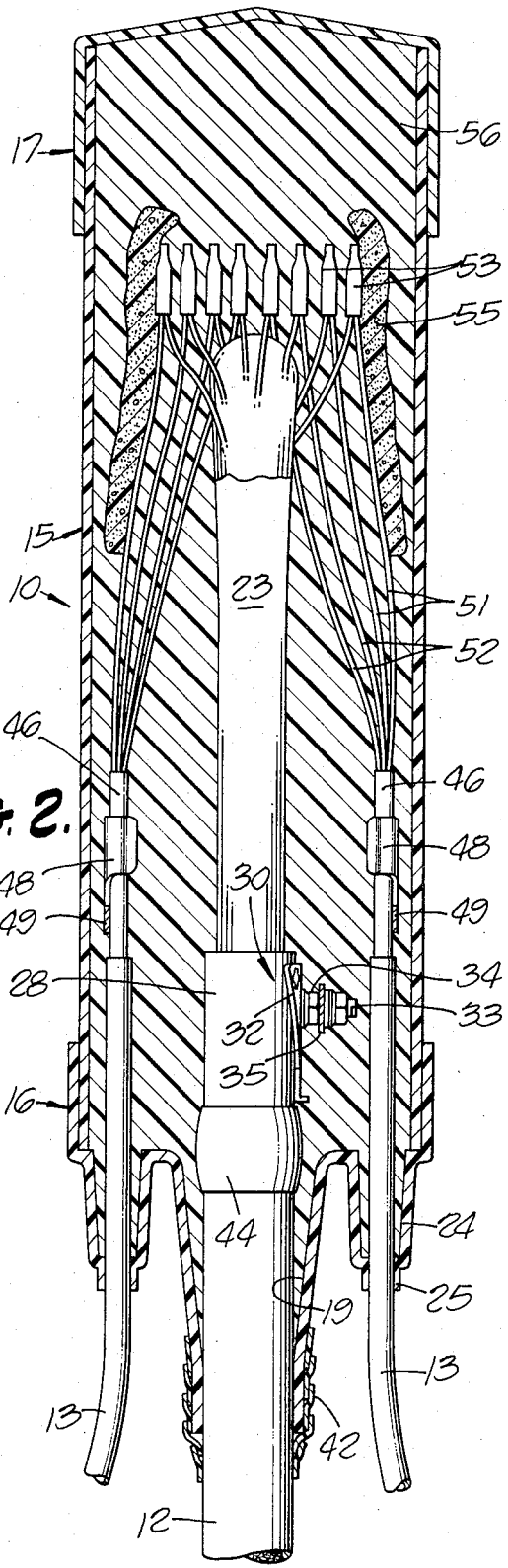
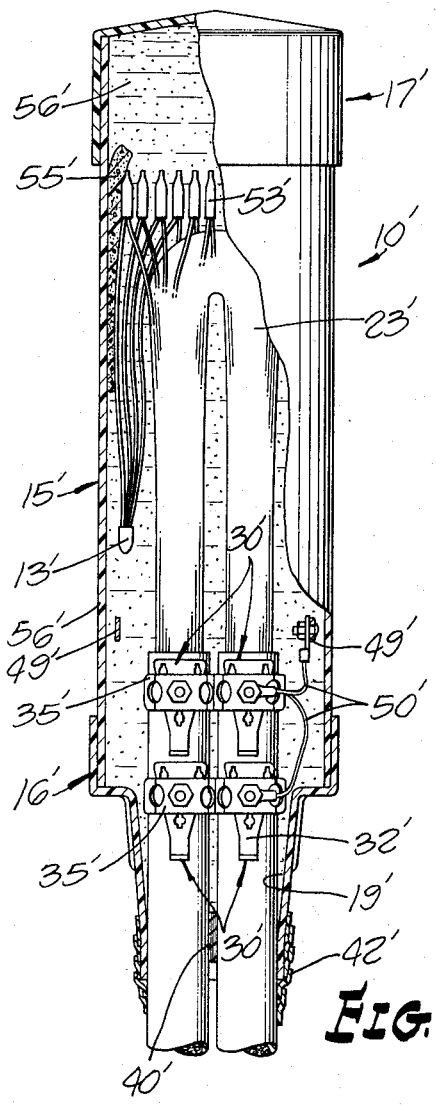

PATENTED APR 23 1974 3,806,630

ENCAPSULATED SPLICE ASSEMBLY FOR BURIED CABLES

This invention relates to cable splice assemblies, and more particularly to an improved method and a set of simple inexpensive components for encapsulating splice connections between a main cable and one or more branchout service cables in an enclosure adapted to be buried in dirt.

Public utility power and telephone systems are confronted with serious and costly problems in providing inexpensive highly reliable splice connections between main distribution cables and branchout service cables to individual subscribers. The modern trend is to safeguard the main cables by placing them underground but this necessitates taking extra precautions to safeguard against the entry of moisture into the cable. It has been the general practice to minimize these risks by supporting the splice assemblies in an upright position with the connections enclosed within an inverted impervious cap or dome. Alternatively, other splice assemblies employ a protective housing sealed to the cable and having its components sealed together by various clamping and sealing expedients and housed in a covered protective well in the ground. Our copending applications Ser. No. 071,149, filed Sept. 10, 1970, now U.S. Pat. No. 3,725,580 and Ser. No. 168,178, filed Aug. 2, 1971, now U.S. Pat. No. 3,725,581 disclose typical embodiments of this practice. These copending embodiments are eminently satisfactory but embody more components and are more costly than is desirable under certain service requirements and needs. For example, in these embodiments the legs of the cable loop are held rigidly in position by a rigid housing ring embracing an encapsulating ring of thermosetting compound, and the splice zone is enclosed by a main housing member or cap formed of flexible supple material telescoped over the rigid ring and held sealed thereto by a clamping band. The flexible cap member compensates for changes in ambient pressure conditions and is unsuitable for burial in dirt for this reason and because of the risk of crushing, rupture or damage to the internal components.

The present invention provides a greatly simplified and highly reliable set of components easily and expeditiously assembled to provide a fully encapsulated splice assembly which can be safely buried in dirt without need for a well or other protective structure in the ground. No clamps or fasteners of any kind are required to hold the housing components together, the housing proper comprising but three simple components, namely, an extruded main housing of rigid tough plastic closed at its opposite ends by caps of soft, supple, resilient elastomer having an interference press fit with the main body tube. The entrance end cap is not relied upon in any substantial degree for its strength in supporting the legs of the main cable but instead, these relatively rigid legs are firmly anchored together by one or more short electrical and mechanical ties extending crosswise of the legs inwardly of the entrance end cap and anchored firmly to the cable sheath of each loop leg. This bonding tie utilizes a pair of clamping shoes astride the tough cable sheath and the underlying shield jacket. Since this bonding clamp is confined entirely to one side of the cable, no compressive pressure is applied to the conductors by the tie and reliance is placed on the high strength of the cable sheath itself and the rigidity of the short cross tie strap, applied either singly or in multiple, to hold the legs of the cable loop firmly against any material relative movement. This avoids the need for an entrance splice housing cap of any substantial strength, and the need for an anchorage between the loop legs and this cap.

The service cables enter the entrance cap through soft tubular extensions, the entrance end of which are sized to have a close sealing fit with the exterior of the service cables. The inner ends of the service cable conductors are spliced directly to selected conductors of the cable loop and the shield jacket of the service cable may be bonded by a lead wire to the bonding connection between the shields of the legs of the cable loop.

Prior to the assembly of the main body tube over the cable loop, the latter and the splice connections are encircled with porous spongy material readily penetrated by the potting compound. Thereafter and before the top end cap is telescoped into position the interior of the splice housing is charged from the bottom upwardly with either a solidifiable or a permanently non-setting gel-like potting compound. If the gel-like compound is employed then the splice housing may be re-entered at any time for servicing, testing or the addition of more service cables. After the encapsulation has been completed, the splice housing may be safely buried directly in dirt without risk of moisture entering the interior or reaching the conductors or the splice connections.

Accordingly, it is a primary object of this invention to provide an improved and simplified method of completing encapsulated splice connections between a main cable and one or more branchout service cables.

Another object of the invention is the provision of an improved technique utilizing a minimum number of simple components for completing a hermetically sealed encapsulated splice assembly between a plurality of cables.

Another object of the invention is the provision of an improved and simple technique for electrically and mechanically interconnecting the legs and shield jackets of a cable loop preliminary to splicing select conductors to branchout service cables.

Another object of the invention is the provision of an improved, simplified splice housing for cables adapted to be buried in dirt and held assembled and sealed against the risk of moisture entry without need for fasteners or clamping expedients.

Another object of the invention is the provision of a simplified, inexpensive, high strength, cable splice assembly for a looped main cable wherein the legs of the cable loop are rigidly interconnected independently of the splice housing.

These and other more specific objects will appear upon reading the following specification and claims and upon considering in connection therewith the attached drawing to which they relate.

Referring now to the drawing in which a preferred embodiment of the invention is illustrated:

FIG. 1 is a generally schematic view showing a typical embodiment of the invention splice assembly after completion and coverage with dirt;

FIG. 2 is a vertical sectional view on an enlarged scale of one preferred embodiment of the splice assembly and taken crosswise of one leg of the cable loop, the interior being charged with solidified potting compound;

Figure 4:
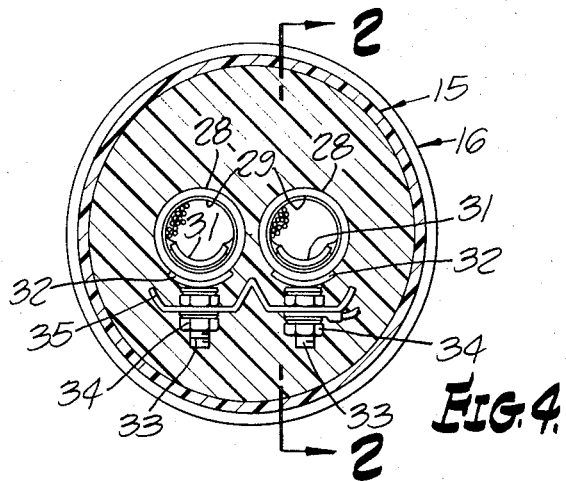
Figure 5:
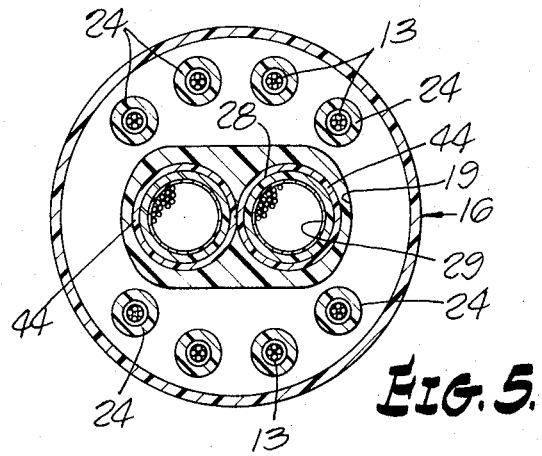
Figure 6:
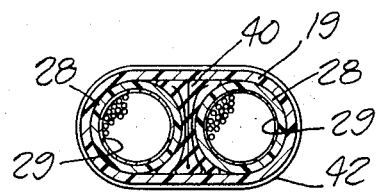
Figure 7:
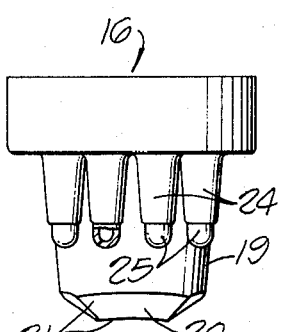
Figure 8:
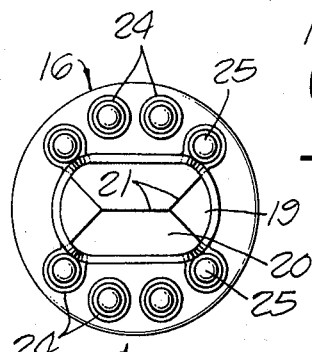
Figure 3:
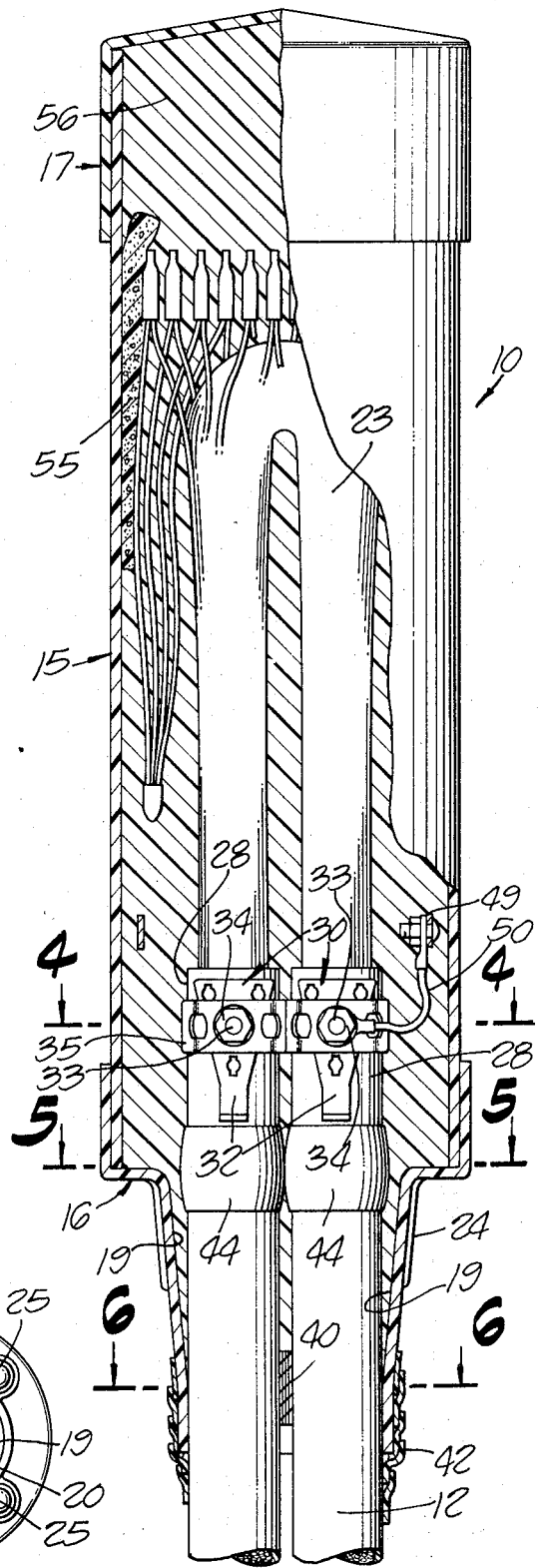
FIG. 3 is a view similar to FIG. 2 but taken on a plane passing through both legs of the cable loop.

FIGS. 4, 5 and 6 are cross sectional views taken respectively along lines 4—4, 5—5, and 6—6 on FIG. 3;

FIG. 7 is an elevational view of the cable entrance cap;

FIG. 8 is a bottom plan view of FIG. 7; and

FIG. 9 is a vertical sectional view of a second embodiment of the invention generally similar to FIG. 3 and differing essentially from the FIGS. 1 to 8 embodiment in that the housing is charged with a non-setting gel-like poting compound.

Referring initially more particularly to FIGS. 1 through 8, there is shown an illustrative embodiment of the invention encapsulated splice housing, designated generally 10, buried below the ground surface and enclosing splice connections between a loop in a main cable 12 and two service cables 13,13.

Splice assembly 10 comprises three principal parts, namely, a rigid tubular housing 15 of tough high strength plastic material, a lower or entrance end cap 16 and a top end cap 17. The two caps 16 and 17 are molded from supple, pliant, slightly resilient, elastomeric material and so dimensioned that the interior sidewalls have a forced press fit with the ends of main body tube 15. The stretch required for the assembly of the end caps over tube 15 assures a fluid-tight junction but is insufficient to risk cold flow or objectionable strain on the cap sidewalls. No clamping bands or other fasteners are required to hold the end caps snugly and hermetically sealed and, owing to the surface characteristics of the end caps, they adhere tenaciously to the juxtaposed surfaces of tube 15.

Entrance end cap 16 has a deep, non-circular well 19 extending outwardly from its bottom. The outer end of the well or extension 19 has a crested closure in order that it may be severed along the crest lines 21 to the extent necessary to permit insertion of the unsheathed loop 23 of the main cable conductors. Also projecting downwardly from the bottom of cap 16 to either side of extension 19 are two groups of nipples 24,24 also initially closed at their lower ends by a domed cap 25. Caps 25 are cut off only in the event a service cable is to be inserted along that nipple for splicing to conductors of cable loop 23. The interior diameter of caps 25 is preferably slightly less than the diameter of the service cables 13 so as to have a snug frictional fit therewith.

The assembly of splice housing 10 about loop 23 of main cable 12 is accomplished as follows. The buried cable is exposed at the point where it is desired to splice the branchout service cables 13,13 to the main cable conductors. At the time of laying the main cable, excess cable is customarily left at spaced points therealong adequate to form a shape loop 23 therein following removal of a length of its sheath. This sheath typically comprises thick-walled tough plastic material 28 (FIG. 6) embracing a metallic electric shield layer 29 of foil-like metal or braid. A length of sheath 28 and of shield 29 is removed adequate to expose the hairpin loop of conductors 23. This having been done, the operator proceeds to install the wide area bonding and clamping shoe assemblies, designated generally 30,30, with the shield layer 29 and the cable sheath 28 sandwiched between an inner shoe 31 and an outer shoe 32. These bonding shoes, best illustrated generally in FIG. 4, are clamped together astride sheath 28 and shield 29 in the manner disclosed in detail in applicants' U.S. Pat. No. 3,676,836. All portions of bonding assemblies 30,30 are formed of metal and utilize the high strength of the cable sheath to provide a high strength electrical and mechanical connection to shield layer 29 without reliance on the strength of the shield layer and without placing the conductors of cable 12 under the clamping pressure exerted by bolts 33 and nuts 34. Each set of bonding shoes 31,32 having been installed on the legs of the cable loop, the bolts 33 of the clamping assemblies are bridged and interconnected by a short length of strong conductive material, such as the strap 35 formed with holes which are inserted over the shanks of bolts 33 and clamped in place by clamping nuts 34. Connecting strap 35 is best shown in FIGS. 3 and 4 wherein it is clear that this strap and its connection to the sheath of the cable legs assures that the legs of the cable loop are anchored firmly together in closely spaced relation. Additionally, this same high strength connection interconnects the shield layers 29 of the two cable legs by conductive means adequate to carry heavy electrical charges sometimes accidentally imposed on cables by short circuits, lightning strokes and the like.

Before pulling the legs of the cable downwardly through well 19 of cap 16, several layers of soft tape 40 (FIGS. 3 and 6) are positioned between the legs of the cable to provide a sealing plug, as best shown in FIG. 6. The legs of the cable loop are then pulled into the position shown in FIG. 3 and the exterior of well 19 is served snugly with overlapping convolutions of friction tape 42. If the splice connections are to be encapsulated in a solidifying potting compound it may be desirable to wrap the loop legs with several convolutions of tape 44 in the area immediately below the bonding shoe assemblies 30 inasmuch as some potting compounds do not form a highly reliable seal with the sheath of some main cables. The tape used in forming the collars 44 is formed of Buna or other suitable material which does readily adhere to the potting compound being used; otherwise, collars 44 may be omitted.

One or more service cables 13 are installed upwardly through the outer ends 25 of nipples 24. These cables usually include a conductive shield layer 46 underlying the cable sheath and an exposed length of this layer is inserted between the U-shaped tangs 48 projecting from a split metallic ring 49 following which these tangs are clenched firmly against shield 46. The bonding ring 49 is disclosed more fully in our copending application Ser. No. 071,149, referred to above, and serves to bond the shields of any of a number of service cable shield jackets to one another and to the bonding assembly of the main cable via a connecting conductor 50 (FIG. 3) secured to post 33 of one of the bonding assemblies.

Each service cable 13 usually includes two pairs of conductors 51,52 either or both of which are spliced to selected conductors of the cable loop 23 as by conventional splice junctions 53,53. These splice junctions are conveniently grouped at the upper end or along the sides of the cable loop. After these have been completed they are compressed against the sides of the loop and encircled with one or more layers of thick, open-pored, resilient, elastomeric material 55, the pores of this material being of adequate size to permit ready passage therethrough of the potting compound during the compound charging operation. The encircling layer of spongy material 55 serves to hold the splice junctions centralized and spaced inwardly from the inner surface of housing 15.

The foregoing assembly having been completed, tubular housing 15 is telescoped over loop 23 and splice junctions 53 as its lower end is forced into nesting relation with the sidewall of lower end cap 16. The upper end cap 17 having been removed, the interior of the splice housing is charged with potting compound 56 in liquid form care being taken to introduce the compound into the bottom of the housing so that all areas are forced upwardly and escapes through the upper end of the housing. Desirably a thermosetting resinous compound is employed of a type having excellent sealing characteristics with the surface of all internal components in contact therewith. Compound 56 is allowed to take a permanent set and cap 17 is assembled over the upper end to provide an encapsulated splice assembly permanently hermetically sealed against the entrance of water, moisture and other foreign matter and which may be directly buried in dirt.

An alternate embodiment of the splice assembly is illustrated in FIG. 9, all parts being designated by the same reference characters as in FIGS. 1–8 but distinguished therefrom by the addition of a prime. Substantially the only difference between the two modifications is that the splice housing is charged with a permanently, non-setting, gel-like potting compound 56' and additionally, the legs of cable loop 23' are preferably mechanically and electrically interconnected by two sets of bonding assemblies 30',30' and two bonding straps or ties 35',35'. These two ties may, but need not be, interconnected by a second conductive connector 50'. The collars 44 wrapped about the legs of the cable loop in the first embodiment may be omitted in the second embodiment since gel 56' makes an excellent sealing contact with the surfaces of the cable sheaths.

There is also a variation in the manner of assembly of the second embodiment. For example, it is convenient to use a dispensing gun in charging the encapsulating gel. Initially the long snout of this gun, not shown, is used to dispense a mass of the gel between the splice junctions and within the return bend portion of cable loop 23. Thereafter, housing 15' is telescoped over the mass of gel and the cable loop and seated within the lower end cap 16. The dispensing nozzle is then inserted downwardly into the proximity to the lower cap and manipulated to fill the housing from the bottom upwardly being sure that air is not trapped and that all interior portions are charged including the pores of spongy layer 55'. After the housing has been completely charged with the gel, end cap 17' is installed and the completed splice assembly 10' may then be laid in a trench as shown in FIG. 1 and covered with dirt.

While the particular encapsulated splice assembly for buried cables herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. That method of preparing an underground shielded main cable for splicing and encapsulation of splice connections to branchout service cables which comprises: unsheathing a length of said main cable sufficiently to form a U-shaped loop of exposed conductors, inserting said loop of conductors upwardly through the bottom of a well extending downwardly from the bottom of a cup-shaped cap of supple elastomeric material, sandwiching and tightly clamping a wide area portion of the cable sheath and shield jackets on each leg of said loop between a respective pair of wide area metallic clamping shoes confined to one side of the associated leg of said loop in an area adjacent the interior side of the bottom of said cap thereby to provide a strong mechanical and electrical connection to the shield jacket on each leg of said loop without applying pressure to the cable conductors, and interconnecting said pairs of clamping shoes by a short high-strength conductive member extending crosswise of said loop legs thereby electrically bonding said shielding jackets to one another and additionally effective as a strong mechanical tie holding said loop legs against substantial movement relative to one another and to the supple material of said cap.

2. That method defined in claim 1 characterized in the steps of inserting at least one branchout service cable through a snug-fitting opening in the bottom of said cap, splicing a pair of service cable conductors to a pair of conductors of said cable loop before telescoping a non-conductive housing over said cable loop and into a fluid-tight telescopic press fit with the interior sidewall surfaces of said cap of supple material.

3. That method defined in claim 2 characterized in the step of completing the encapsulating operation by charging the interior of said housing and said cap with potting compound to seal said cable loop and said conductors against the entry of moisture.

4. That method defined in claim 2 characterized in the step of completing the encapsulation of said cable loop by charging the interior of said housing and said cap with permanently non-setting gel-like potting compound whereby said housing may be re-entered for servicing and thereafter reclosed with and recharged with potting compound.

5. That method defined in claim 2 characterized in the step of completing the encapsulation of said cable loop by charging the interior of said housing and said cap with a setting resinous compound effective to hermetically seal the same permanently closed.

6. That method defined in claim 2 characterized in the step of encircling said cable loop and spliced conductors with a thick layer of open-pored elastomeric material to hold said conductors spaced inwardly from the wall of said housing.

7. That method defined in claim 6 characterized in the step of completing the encapsulating operation by charging the interior of said cap and said housing with potting compound progressively from the bottom of said cap to the remote end of said housing.

8. That method defined in claim 7 characterized in the step of capping the upper end of said housing with a cap of supple elastomeric material having a press fit with the end of said housing.

9. That method defined in claim 1 characterized in the steps of inserting at least one branchout service cable through a snug-fitting opening in the bottom of said cap, splicing a pair of the service cable conductors to a pair of cable loop conductors, telescoping an open-ended rigid tubular housing over said cable loop and into a press fit with the interior sidewall of said cap, and charging the interior of said cap and housing with potting compound progressively upwardly from the bottom of said cap.

10. That method of encapsulating the splice connections of one or more service cables to a shielded main cable within a protective housing adapted to be buried in dirt which method comprises: inserting the unsheathed looped portion of a shielded main cable through the slit bottom of a deep well opening into the bottom of a cup-shaped cap of supple elastomeric material, installing and tightly clamping a pair of wide area metallic shoes astride the shield and sheath on one side of each leg of the main cable loop in an area near the interior side of said cap, interconnecting said shoes by a short rigid conductive member extending crosswise of said legs and additionally effective as a mechanical tie holding the loop legs against a substantial relative movement, inserting service cable means through openings in the bottom of said cap and splicing individual conductors to individual conductors of said cable loop, and enclosing said cable loop with a housing having a rigid tubular main body telescoped to said cap and charged with a non-setting gel-like encapsulating compound.

11. That method of processing an unsheathed loop of a shielded main cable buried in the ground to provide encapsulated splice connections between said cable loop and conductors of a branchout service cable and which cable loop and splice connections are enclosed by a protective housing comprising a rigid tubular main body and first and second end caps of supple elastomeric material having a press fit with the respective ends of said main body, said method comprising: inserting said unsheathed cable loop through a single opening in the bottom of said first cap, holding the legs of said cable loop rigidly tied together in side-by-side relation interiorly and independently of said first cap by a strong short conductive mechanical connection between the cable sheath on each leg of the cable loop and electrically connected to the shield of each leg of said cable loop, sealing the legs of said cable loop to the bottom of said first cap, inserting branchout service cable means through an opening in the bottom of said first cap, splicing conductors of said service cable means to conductors of said cable loop, telescoping said rigid main housing over said cable loop into a press fit with the interior side wall of said first cap, charging said first cap and main housing with non-setting gel-like compound, and pressing said second cap over the end of said main housing before burying said encapsulated cable loop in dirt.

12. That improvement in cable splice assemblies between buried cables and branchout service cables therefrom and adapted to be buried upon completion, said splice assembly comprising: an open-ended rigid tubular housing of non-conductive material closed at its ends by first and second caps of supple elastomeric material having a forced press fit with said housing, a shielded main cable loop having the legs thereof extending through a well projecting from the bottom of said first cap, service cable means extending through the bottom of said first cap beside the legs of said cable loop, conductive means confined to one side of said loop legs adjacent the interior bottom of said first cap bonding the cable shield of each leg together, splice connections between conductors of said cable loop and conductors of said service cable means, and a charge of potting compound filling said splice assembly and charged thereinto while said second cap is detached and fully encapsulating said cable loop and said spliced conductors.

13. That improvement defined in claim 12 characterized in the provision of a thick layer of porous elastomeric material encircling said cable loop adjacent the interior sidewall of said rigid housing.

14. That improvement defined in claim 12 characterized in that said service cable means are shielded, and conductive bonding means interconnecting the shield of said service cable means and said conductive means connected to the shielded legs of said cable loop.

15. That improvement defined in claim 12 characterized in that said first cap is provided with a plurality of supple nipples to at least some of which have closed ends adapted to be severed when needed to accommodate a single service cable means extending axially of the nipple.

* * * * *